(12) United States Patent
Kuo et al.

(10) Patent No.: US 12,541,587 B2
(45) Date of Patent: Feb. 3, 2026

(54) ADDRESSING STRUCTURED FALSE POSITIVES DURING ASSET ANOMALY DETECTION

(71) Applicant: International Business Machines Corporation, Armonk, NY (US)

(72) Inventors: Bo-Yu Kuo, Kaohsiung (TW); Yu-Jin Chen, New Taipei (TW); Yu-Chi Tang, New Taipei (TW); Shih Hsuan Lee, Zhuangwei (TW)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 18/112,225

(22) Filed: Feb. 21, 2023

(65) Prior Publication Data

US 2024/0281522 A1  Aug. 22, 2024

(51) Int. Cl.
*G06F 21/55* (2013.01)
*G06N 3/0442* (2023.01)
*G06N 3/08* (2023.01)

(52) U.S. Cl.
CPC ......... *G06F 21/552* (2013.01); *G06N 3/0442* (2023.01); *G06N 3/08* (2013.01); *G06F 2221/034* (2013.01)

(58) Field of Classification Search
None
See application file for complete search history.

(56) References Cited

U.S. PATENT DOCUMENTS

| 9,817,884 B2 | 11/2017 | Greifeneder et al. |
| 10,187,403 B2 | 1/2019 | Gopalakrishnan et al. |
| 10,931,692 B1 | 2/2021 | Mota et al. |

(Continued)

OTHER PUBLICATIONS

Grill, Martin et al. Reducing false positives of network anomaly detection by local adaptive multivariate smoothing. Journal of Computer and System Sciences, vol. 83 Issue 1, Feb. 2017, pp. 43-57, Elsevier Science Direct. <https://www.sciencedirect.com/science/article/pii/S0022000016300022>.

(Continued)

*Primary Examiner* — Syed A Roni
(74) *Attorney, Agent, or Firm* — James L. Olsen

(57) ABSTRACT

Techniques are described with regard to addressing structured false positives in the context of detecting asset anomalies in a computing environment. An associated computer-implemented method includes applying an anomaly detection machine learning model to each of a plurality of assets in order to determine a plurality of anomaly assets among the plurality of assets. The plurality of anomaly assets are determined based upon a model anomaly risk score calculated for each of the plurality of assets consequent to asset event data analysis. The method further includes calculating a structured false positive score for each of the plurality of anomaly assets during a current structured false positive time window. The method further includes retraining the anomaly detection machine learning model responsive to determining that a threshold value of anomaly assets among the plurality of anomaly assets have a structured false positive score exceeding a structured false positive threshold value.

17 Claims, 8 Drawing Sheets

(56) References Cited

U.S. PATENT DOCUMENTS

| | | | |
|---|---|---|---|
| 2015/0128263 A1* | 5/2015 | Raugas | G06F 21/552 |
| | | | 726/23 |
| 2018/0337836 A1 | 11/2018 | Balabine et al. | |
| 2021/0051165 A1 | 2/2021 | Sarfraz et al. | |
| 2021/0073060 A1* | 3/2021 | Grant | G06F 11/3089 |
| 2022/0060491 A1* | 2/2022 | Achleitner | H04L 63/1425 |

OTHER PUBLICATIONS

Al Jallad, Khloud et al. Anomaly detection optimization using big data and deep learning to reduce false-positive. Journal of Big Data, vol. 7, Article No. 68, Aug. 31, 2020, pp. 1-12, Springer Open. <https://journalofbigdata.springeropen.com/articles/10.1186/s40537-020-00346-1>.

* cited by examiner

ADDRESSING STRUCTURED FALSE POSITIVES DURING ASSET ANOMALY DETECTION

BACKGROUND

The various embodiments described herein generally relate to asset anomaly detection. More specifically, the various embodiments relate to addressing structured false positives during asset anomaly detection.

SUMMARY

The various embodiments described herein provide techniques of identifying and accounting for structured false positives in the context of detecting asset anomalies in a computing environment. An associated computer-implemented method includes applying an anomaly detection machine learning model to each of a plurality of assets in a computing environment in order to determine a plurality of anomaly assets among the plurality of assets based upon a model anomaly risk score calculated for each of the plurality of assets consequent to asset event data analysis. The method further includes calculating a structured false positive score for each of the plurality of anomaly assets during a current structured false positive time window. The method further includes retraining the anomaly detection machine learning model responsive to determining that a threshold value of anomaly assets among the plurality of anomaly assets have a structured false positive score exceeding a structured false positive threshold value. In an embodiment, the method further includes calculating a total anomaly risk score for each of the plurality of anomaly assets by deducting the structured false positive score calculated for each of the plurality of anomaly assets from the model anomaly risk score calculated for each of the plurality of anomaly assets. In an embodiment, responsive to user input, the method further includes providing a model retraining summary via at least one user application interface, wherein the model retraining summary includes structured false positive data and a listing of anomaly assets among the plurality of anomaly assets having a structured false positive score calculated during the current structured false positive time window that exceeds the structured false positive threshold value.

According to one or more embodiments, configuring the anomaly detection machine learning model includes parsing respective behavioral attributes from event data associated with one or more of the plurality of assets; and training the anomaly detection machine learning model by applying at least one classification algorithm to derive associations between the respective behavioral attributes and each of a plurality of asset types.

According to one or more further embodiments, applying the anomaly detection machine learning model to each of the plurality of assets includes predicting for the asset an asset type among a plurality of asset types based upon analyzing event data associated with the asset in view of model-derived associations between respective behavioral attributes and each of the plurality of asset types; calculating, via the anomaly detection machine learning model, the model anomaly risk score for the asset based upon a normalized probability ratio value associated with a correct model prediction of the asset type for the asset; and identifying the asset as an anomaly asset responsive to determining that the model anomaly risk score calculated for the asset exceeds a model anomaly risk threshold value.

According to one or more further embodiments, calculating the structured false positive score for each of the plurality of anomaly assets during the current structured false positive time window includes averaging a structured false positive score for the anomaly asset during a time window immediately preceding the current structured false positive time window with a calculated difference between an asset type abnormal ratio value and a curve deviation value.

According to one or more further embodiments, retraining the anomaly detection machine learning model includes analyzing event data respectively related to each anomaly asset among the plurality of anomaly assets having a structured false positive score calculated during the current structured false positive time window that exceeds the structured false positive threshold value; and refining model-derived associations between respective behavioral attributes and each of a plurality of asset types by expanding a behavioral attribute range associated with one or more of the plurality of asset types.

One or more additional embodiments pertain to a computer program product including a computer readable storage medium having program instructions embodied therewith. According to such embodiment(s), the program instructions are executable by a computing device to cause the computing device to perform one or more steps of and/or to implement one or more embodiments associated with the above recited computer-implemented method. One or more further embodiments pertain to a system having at least one processor and a memory storing an application program, which, when executed on the at least one processor, performs one or more steps of and/or implements one or more embodiments associated with the above recited computer-implemented method.

BRIEF DESCRIPTION OF THE DRAWINGS

So that the manner in which the above recited aspects are attained and can be understood in detail, a more particular description of embodiments, briefly summarized above, may be had by reference to the appended drawings. Note, however, that the appended drawings illustrate only typical embodiments of the invention and therefore are not to be considered limiting of its scope, for the invention may admit to other equally effective embodiments.

DETAILED DESCRIPTION

Figure 1:
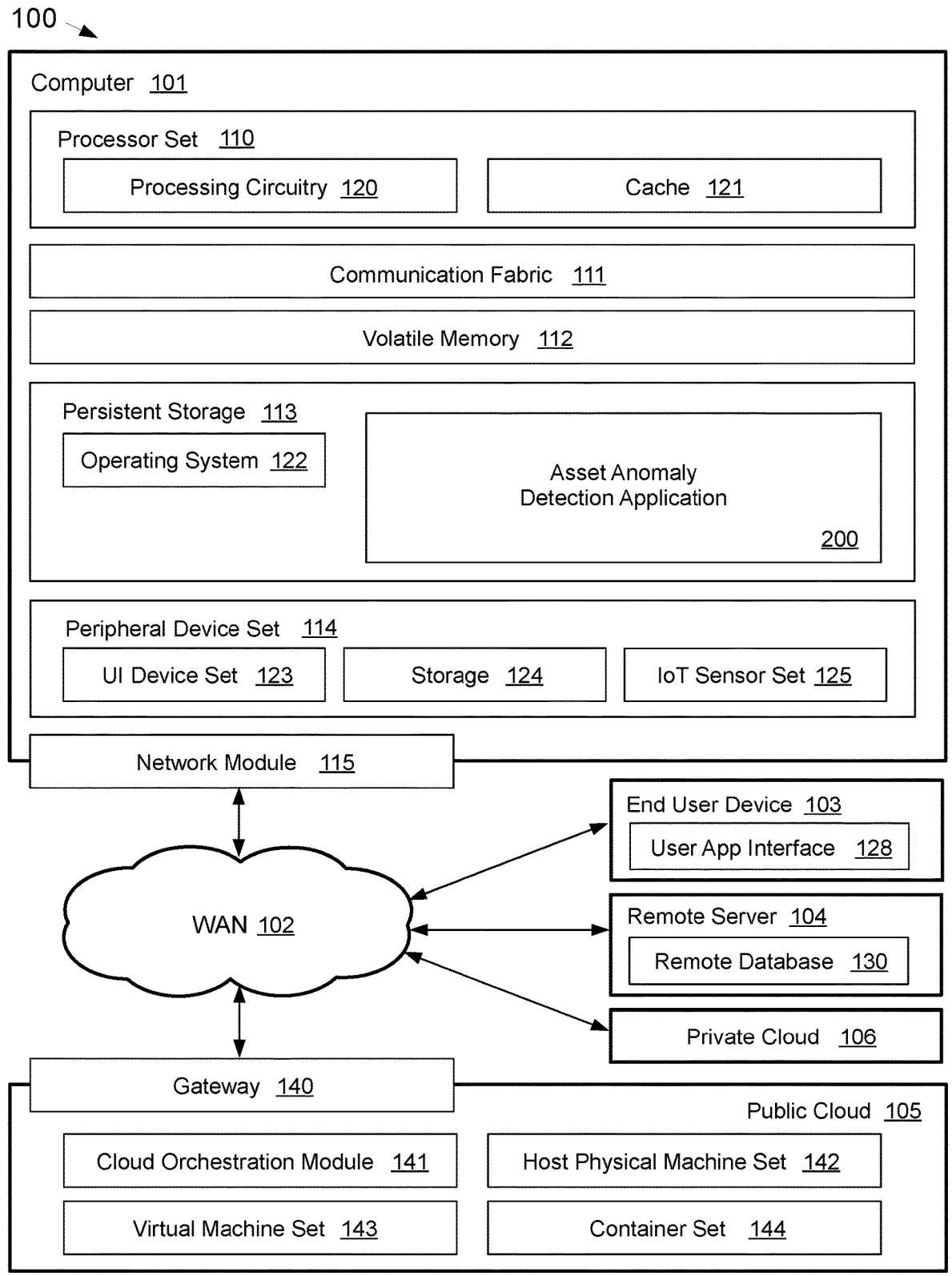
FIG. 1 illustrates a computing infrastructure, according to one or more embodiments.

The various embodiments described herein are directed to addressing structured false positives in the context of detecting anomalies among a plurality of assets via application of an anomaly detection machine learning model. In the context of the various embodiments, an asset is a hardware or virtualized software entity within a computing environment having a unique Internet Protocol address. An asset may be a machine, hardware-based computing system, article of manufacture, or appliance capable of being managed through a network, e.g., a wide area network and/or a local area network. For instance, an asset may be a desktop, handheld device, database server, production server, or firewall component. In the context of the various embodiments, the anomaly detection machine learning model is a machine learning knowledge model configured to detect anomalies with respect to asset events.

In the context of the various embodiments, a structured false positive is an erroneous determination of an anomaly associated with an asset based upon analysis of one or more unexpected but intentional events related to the asset. Such erroneous determination of an asset anomaly may arise due to one or more events related to the asset that are infrequent but based upon planned activity. For instance, given uncharacteristically high usage behavior events associated with production server assets prior to a significant product release, upon application of the anomaly detection machine learning model the production server assets may be misidentified as anomaly assets based upon a failed prediction of an asset type for the production server assets in view of the high usage behavior events generally uncharacteristic for production server assets. The anomalous determination may be a structured false positive consequent to the high usage behavior events, which in fact do not indicate anomalous asset behavior given that high usage behavior events among the production server assets is normal prior to such a significant product release.

In the context of the various embodiments, a structured false positive results in misidentification (i.e., erroneous identification) of an affected asset as an anomaly asset. According to the various embodiments described herein, structured false positives may be addressed by retraining the anomaly detection machine learning model to account for event data associated with any such structured false positive. Specifically, model-derived associations between behavioral attributes and asset types may be refined consequent to structured false positive detection. By retraining the anomaly detection machine learning model to address a structured false positive, misidentification of any asset affected by such structured false positive as an anomaly asset may be avoided during subsequent model application.

The various embodiments described herein have advantages over conventional techniques. Specifically, the various embodiments improve computer technology by providing a technique for dynamically retraining the anomaly detection machine learning model responsive to determining that a structured false positive threshold value has been exceeded in the context of asset anomaly detection. By retraining the anomaly detection machine learning model to address structured false positives, the various embodiments facilitate provision of more accurate model anomaly risk scores that account for structured false positive event data. Furthermore, by retraining the anomaly detection machine learning model to address structured false positives, structured false positive detection rates may be decreased during subsequent model application. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments, and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in one or more claims.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one or more storage devices that collectively include machine readable code corresponding to instructions and/or data for performing computer operations specified in a given computer program product claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data typically is moved at some occasional points in time during normal operations of a storage device, such as during access, de-fragmentation, or garbage collection, but this does not render the storage device as transitory because the data is not transitory while it is stored.

Particular embodiments describe techniques relating to asset anomaly detection. However, it is to be understood that the techniques described herein may be adapted to a variety of purposes in addition to those specifically described herein. Accordingly, references to specific embodiments are included to be illustrative and not limiting.

Computing environment 100 includes an example of an environment for the execution of at least some of the computer code involved in performing the inventive methods, such as code included in or otherwise associated with asset anomaly detection application 200. In addition to asset anomaly detection application 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and asset anomaly detection application 200, as identified above), peripheral device set 114 (including user interface (UI) device set 123, storage 124, and Internet of Things (IoT) sensor set 125), and network module 115. EUD 103 includes user application interface 128. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network, or querying a database, such as remote database 130. Computer 101 is included to be representative of a single computer or multiple computers. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Additionally or alternatively to being connectively coupled to public cloud 105 and private cloud 106, computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories typically are organized into multiple levels depending upon relative proximity to the processing circuitry. Alternatively, some, or all, of the cache 121 for processor set 110 may be located "off chip".

In some computing environments, processor set 110 may be designed for working with qubits and performing quantum computing.

Computer readable program instructions typically are loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions and associated data are accessed by processor set 110 to control and direct performance of the inventive methods. In computing environment 100, at least some of the instructions for performing the inventive methods may be stored in asset anomaly detection application 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, volatile memory 112 is located in a single package and is internal to computer 101, but additionally or alternatively volatile memory 112 may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and rewriting of data. Some familiar forms of persistent storage include magnetic disks and solid state storage devices. Operating system 122 may take several forms, such as various known proprietary operating systems or open source Portable Operating System Interface-type operating systems that employ a kernel. Asset anomaly detection application 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the Internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods typically can be downloaded to computer 101 from an external computer or external storage device through a network adapter card or network interface included in network module 115.

Wide area network (WAN) 102 is any wide area network (e.g., the Internet) capable of communicating computer data over non-local distances by any technology for communicating computer data, now known or to be developed in the future. In some embodiments, WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation typically would be communicated from network module 115 of computer 101 through WAN 102 to EUD 103. In this way, EUD 103 can display, or otherwise present, the recommendation to an end user, e.g., via user application interface 128. In some embodiments, EUD 103 may be a client device, such as thin client, heavy client, mainframe computer, desktop computer, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, such historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. Public cloud 105 optionally offers infrastructure as a service (IaaS), platform as a service (PaaS), software as a service (SaaS), and/or other cloud computing services. The computing resources provided by public cloud 105 typically are implemented by virtual computing environments (VCEs) that run on various computers making up the computers of host physical machine set 142, which is the universe of physical computers in and/or available to public cloud 105. The VCEs typically take the form of virtual machines from virtual machine set 143 and/or containers from container set 144. It is understood that such VCEs may be stored as images and may be transferred among and between the various physical machine hosts, either as images or after instantiation of the VCE. Cloud orchestration module 141 manages the transfer and storage of images, deploys new instantiations of VCEs, and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images". A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the perspective of programs running in them. A computer program running on an ordinary operating system can utilize all resources of that computer, such as connected devices, files and folders, network shares, central processing unit (CPU) power, and quantifiable hardware capabilities. However, programs running inside a container only can use the contents of the container and devices assigned to the container, a feature which is known as containerization.

Private cloud 106 is similar to public cloud 105, except that the computing resources only are available for use by a single enterprise. While private cloud 106 is depicted in FIG. 1 as being in communication with WAN 102, in other embodiments a private cloud may be disconnected from the internet entirely and only accessible through a local/private network. A hybrid cloud is a composition of multiple clouds of different types (e.g., private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 both are part of a larger hybrid cloud.

In the context of the various embodiments described herein, components of computing environment 100, including aspects of asset anomaly detection application 200, provide, or are configured to provide, any entity associated with asset anomaly detection, e.g., any administrator associated with computer 101 or any user associated with EUD 103, advance notice of any personal data collection. Components of computing environment 100 further provide, or further are configured to provide, any affected entity an option to opt in or opt out of any such personal data collection at any time. Optionally, components of computing environment 100 further transmit, or further are configured to transmit, notification(s) to any affected entity each time any such personal data collection occurs and/or at designated time intervals.

Figure 2:
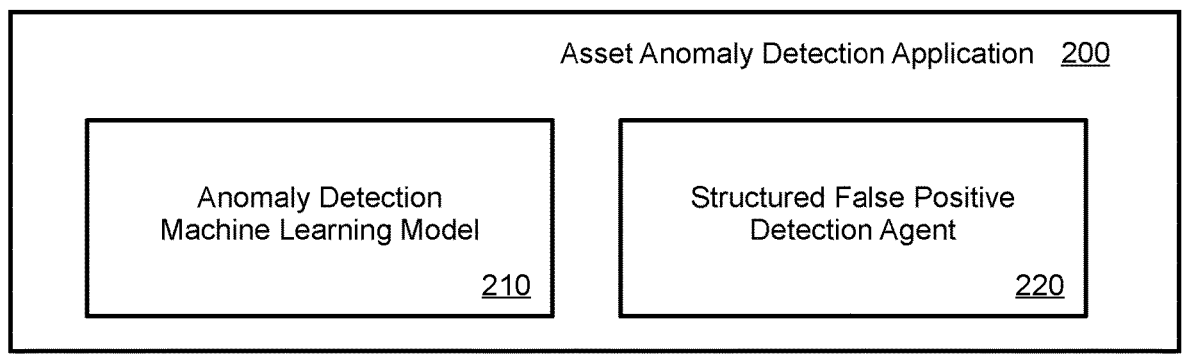
FIG. 2 illustrates an example schematic diagram of an asset anomaly detection application, according to one or more embodiments.

FIG. 2 illustrates an example schematic diagram of asset anomaly detection application 200. Asset anomaly detection application 200 includes anomaly detection machine learning model 210. Anomaly detection machine learning model 210 is a machine learning knowledge model configured to detect anomaly assets based upon asset event data in the context of the various embodiments described herein. Anomaly detection machine learning model 210 accesses and stores data in at least one associated knowledge base. Optionally, one or more aspects of the at least one knowledge base are located within storage of computer 101 (e.g., within persistent storage 113). Additionally or alternatively, one or more aspects of the at least one knowledge base are located remotely to computer 101, e.g., within remote database 130 of remote server 104. Asset anomaly detection application 200 further includes structured false positive detection agent 220. Structured false positive detection agent 220 includes one or more code modules and/or tools configured to determine structured false positives associated with anomaly asset detection.

Figure 3:
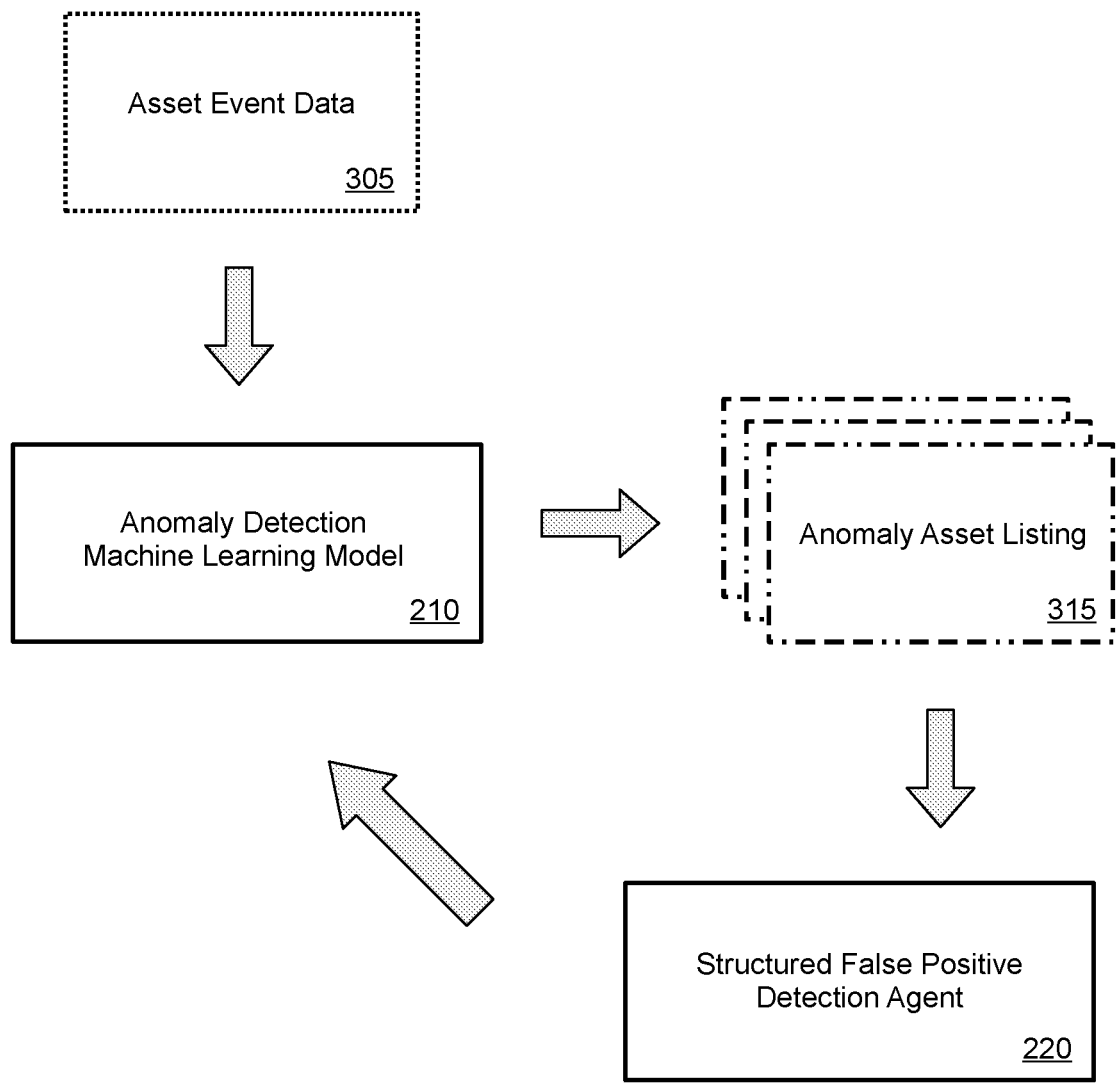
FIG. 3 illustrates an example schematic diagram depicting asset data flow associated with an asset anomaly detection application, according to one or more embodiments.

FIG. 3 illustrates an example schematic diagram depicting asset data flow associated with asset anomaly detection application 200. As illustrated in FIG. 3, asset anomaly detection application 200 receives asset event data 305 associated with a plurality of assets and applies anomaly detection machine learning model 210 to asset event data 305 in order to determine an anomaly asset listing 315 including a plurality of anomaly assets determined among the plurality of assets based upon a model anomaly risk score calculated for each of the plurality of assets. Asset anomaly detection application 200 sends anomaly asset listing 315 to structured false positive detection agent 220. Structured false positive detection agent 220 calculates a structured false positive score for each of the plurality of anomaly assets included in anomaly asset listing 315. Asset anomaly detection application 200 processes structured false positive information based upon calculated structured false positive score for each of the plurality of anomaly assets in order to determine whether retraining of anomaly detection machine learning model 210 is necessary. In an embodiment, asset anomaly detection application 200 sends structured false positive score information from structured false positive detection agent 220 to anomaly detection machine learning model 210 to facilitate any necessary model retraining.

Figure 4:
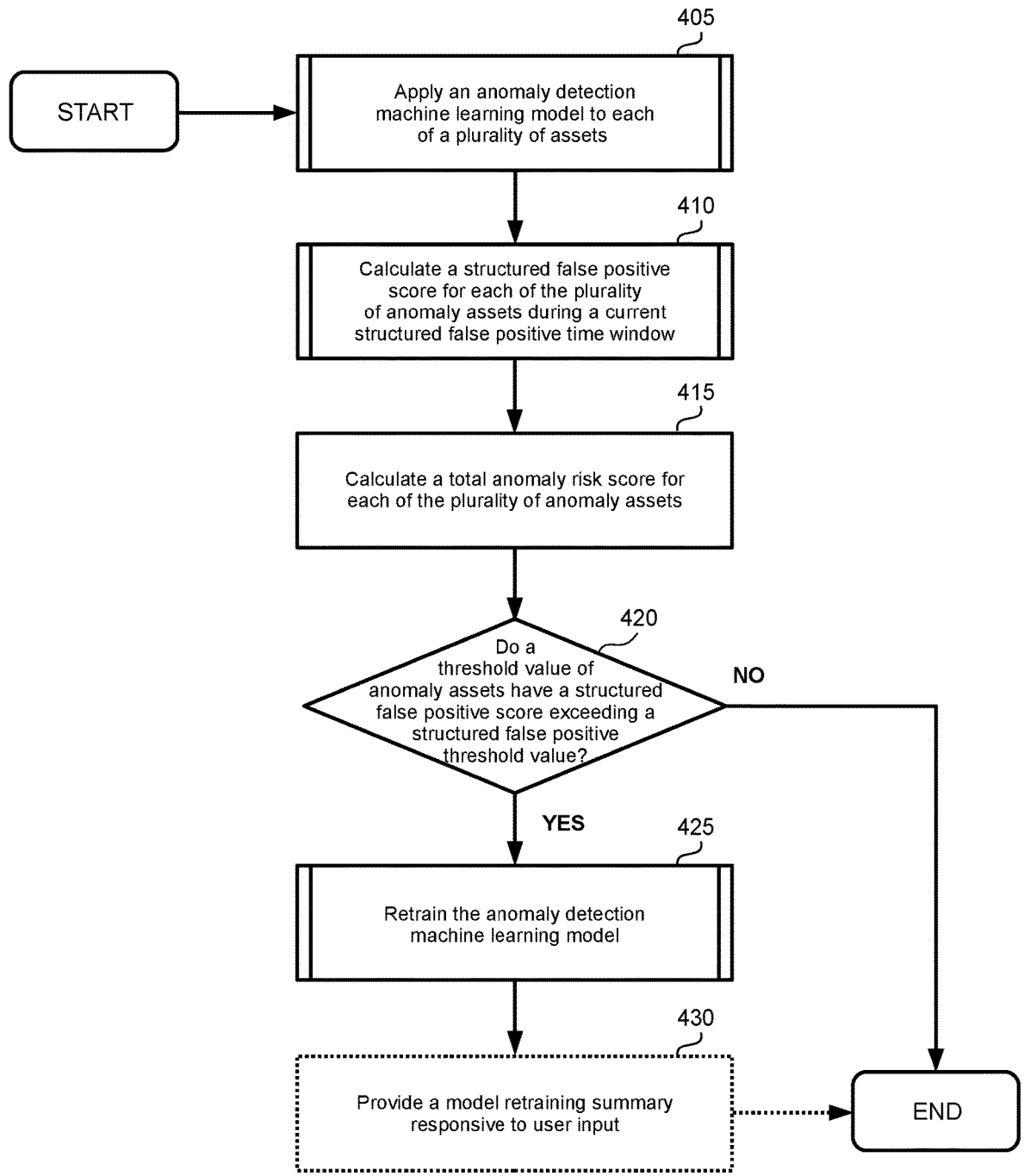
FIG. 4 illustrates a method of addressing structured false positives during asset anomaly detection, according to one or more embodiments.

FIG. 4 illustrates a method 400 of addressing structured false positives during asset anomaly detection. One or more steps associated with the method 400 and related methods described herein optionally are carried out via an asset anomaly detection application in a computing environment (e.g., via asset anomaly detection application 200 included in computer 101 of computing environment 100). In an embodiment, the plurality of assets in the computing environment are communicatively or operatively connected via at least one network (e.g., WAN 102). In an additional embodiment, the asset anomaly detection application is communicatively connected to one or more of the plurality of assets and/or receives event data associated with one or more of the plurality of assets via the at least one network. The asset anomaly detection application determines any structured false positive associated with identified anomaly assets. One or more steps associated with the method 400 and the other methods described herein optionally are carried out within one or more workloads of a cloud computing environment. Such cloud computing environment optionally includes a public cloud (e.g., public cloud 105) and/or a private cloud (e.g., private cloud 106).

The method 400 begins at step 405, where the asset anomaly detection application applies an anomaly detection machine learning model (e.g., anomaly detection machine learning model 210) to each of a plurality of assets in the computing environment. By applying the anomaly detection machine learning model per step 405, the asset anomaly detection application determines a plurality of anomaly assets among the plurality of assets based upon calculating a model anomaly risk score for each of the plurality of assets consequent to analysis of asset event data related to activity in the computing environment. According to an embodiment further described herein, the asset anomaly detection application identifies an asset among the plurality of assets as an anomaly asset per step 405 responsive to determining that the model anomaly risk score calculated for the asset exceeds a model anomaly risk threshold. According to a related embodiment further described herein, the asset anomaly detection application calculates the model anomaly risk score for the asset based upon a normalized probability ratio value associated with correctly predicting asset type for the asset via the anomaly detection machine learning model.

According to step 405, the asset anomaly detection application applies the anomaly detection machine learning model to each of the plurality of assets by evaluating events respectively associated with each of the plurality of assets in order to determine the plurality of anomaly assets. Examples of events associated with an asset include events related to logging into the asset, network usage events related to the asset, data editing events related to the asset, I/O processing events related to the asset, and file access events related to the asset. Such event listing is not exhaustive. The asset anomaly detection application evaluates asset events by receiving and analyzing asset event data (e.g., asset event data 305). The asset anomaly detection application applies the anomaly detection machine learning model to each of the plurality of assets according to step 405 within a model time window. In the context of the various embodiments, a model time window is a defined duration of time during which the asset anomaly detection application applies the anomaly detection machine learning model to each of the plurality of assets. In an embodiment, the asset anomaly detection application generates an anomaly asset listing (e.g., anomaly asset listing 315) including the plurality of anomaly assets determined per step 405. A method of configuring the anomaly detection machine learning model is described with respect to FIG. 5. A method of applying the anomaly detection machine learning model to each of the plurality of assets in accordance with step 405 is described with respect to FIG. 6.

At step 410, the asset anomaly detection application calculates a structured false positive score for each of the plurality of anomaly assets during a current structured false positive time window. In the context of the various embodiments, a structured false positive score is a quantitative measure with respect to whether behavior associated with an anomaly asset among the plurality of assets results from a true anomaly or results from a structured false positive, i.e., an erroneous determination of an anomaly based upon unexpected but intentional events related to the anomaly asset. A relatively higher structured false positive score indicates relatively higher probability of a structured false positive, indicating relatively higher probability that behavior associated with the anomaly asset is erroneously determined as anomalous and thus indicating relatively higher probability that the anomaly asset is misidentified as anomalous consequent to model application per step 405. A relatively lower structured false positive score indicates relatively lower probability of a structured false positive, thus indicating relatively higher probability that the anomaly asset is properly identified as anomalous. In an embodiment, the asset anomaly detection application calculates the structured false positive score for each of the plurality of anomaly assets via a structured false positive detection agent (e.g., structured false positive detection agent 220). In a related embodiment, the structured false positive detection agent is a code module within the asset anomaly detection application. Alternatively, the structured false positive detection agent is a code module external to the asset anomaly detection application and coupled to the asset anomaly detection application via a network (e.g., WAN 102). In an additional related embodiment, to facilitate calculation of the structured false positive score for each of the plurality of anomaly assets per step 410, the asset anomaly detection application sends the anomaly asset listing including the plurality of anomaly assets to the structured false positive detection agent. The asset anomaly detection application calculates structured false positive score only for each of the plurality of anomaly assets among the plurality of assets determined per step 405, since the plurality of assets unassociated with anomaly detection inherently are unassociated with a structured false positive.

In the context of the various embodiments, a structured false positive time window is a defined duration of time during which the asset anomaly detection application calculates the structured false positive score for each of the plurality of anomaly assets. In the context of the various embodiments, a structured false positive time window during which the asset anomaly detection application calculates structured false positive score for each of the plurality of anomaly assets per step 410 is larger than a model time window during which the asset anomaly detection application applies the anomaly detection machine learning model per step 405. A structured false positive time window is larger (i.e., longer) than a model time window in order to address curve deviation with respect to anomaly asset data. A larger structured false positive time window relative to a model time window enables determination of a more accurate curve deviation value, since a relatively smaller (i.e., shorter) model time window permits more anomaly detection and observation within a relatively larger structured false positive time window. Accordingly, the asset anomaly detection application calculates the structured false positive score during the current structured false positive time window by considering multiple applications of the anomaly detection machine learning model during multiple model time windows. Thus, for the current structured false positive time window, the asset anomaly detection application is capable of analyzing anomaly detection machine learning model behavior with respect to each of the plurality of anomaly assets consequent to multiple model applications during multiple model time windows.

In an embodiment, the asset anomaly detection application applies the anomaly detection machine learning model to each of the plurality of assets for a duration of model time windows equivalent to a duration of the current structured false positive time window. For instance, according to such embodiment, given that the current structured false positive time window is 24 hours and that a model time window is 3 hours, since there are 8 3-hour time windows within a 24-hour time window, for the current structured false positive time window the asset anomaly detection application applies the anomaly detection machine learning model to each of the plurality of assets 8 times. Thus, in such instance, within a single structured false positive time window, the asset anomaly detection application analyzes anomaly detection machine learning model behavior with respect to each of the plurality of anomaly assets consequent to 8 different model applications during 8 model time windows. A method of calculating the structured false positive score for each of the plurality of anomaly assets during the current structured false positive time window in accordance with step 410 is described with respect to FIG. 7.

At step 415, the asset anomaly detection application calculates a total anomaly risk score for each of the plurality of anomaly assets by deducting the structured false positive score calculated for each of the plurality of anomaly assets per step 410 from the model anomaly risk score calculated for each of the plurality of anomaly assets consequent to model application per step 405. According to step 415, the asset anomaly detection application calculates a total anomaly risk score for a certain anomaly asset among the plurality of anomaly assets by deducting the structured false positive score calculated for the certain anomaly asset from the model anomaly risk score calculated for the certain anomaly asset. By removing the structured false positive score from the model anomaly risk score in the context of calculating the total anomaly risk score for the certain anomaly asset, the asset anomaly detection application removes structured false positive bias from analysis of anomalous events associated with the certain anomaly asset. Accordingly, a user associated with the computing environment, e.g., a computer network administrator and/or an asset owner, may focus analysis upon anomalous events related to the certain anomaly asset that are unassociated with structured false positive activity.

At step 420, the asset anomaly detection application determines whether a threshold value of anomaly assets among the plurality of anomaly assets have a structured false positive score exceeding a structured false positive threshold value. Responsive to determining that a threshold value of anomaly assets among the plurality of anomaly assets do not have a structured false positive score exceeding the structured false positive threshold value, the asset anomaly detection application proceeds directly to the end of the method 400. Responsive to determining that a threshold value of anomaly assets among the plurality of anomaly assets have a structured false positive score exceeding the structured false positive threshold value, at step 425 the asset anomaly detection application retrains the anomaly detection machine learning model. In the context of the various embodiments, the structured false positive threshold value provides a quantitative metric by which the asset anomaly detection application determines whether behavior associated with an anomaly asset among the plurality of anomaly assets is misidentified as anomalous and results in a structured false positive. In an embodiment, based upon the structured false positive threshold value, the asset anomaly detection application quantitatively determines whether structured false positive score calculated per step 410 indicates a structured false positive for an anomaly asset among the plurality of assets. According to such embodiment, the asset anomaly detection application quantitatively determines that the structured false positive score for an anomaly asset indicates a structured false positive responsive to determining that the structured false positive score calculated for the anomaly asset exceeds the structured false positive threshold value. Conversely, the asset anomaly detection application quantitatively determines that the structured false positive score for an anomaly asset does not indicate a structured false positive responsive to determining that the structured false positive score calculated for the anomaly asset does not exceed the structured false positive threshold value. Consequent to determining that the threshold value of anomaly assets have a structured false positive score exceeding the structured false positive threshold value such that structured false positives are indicated, the asset anomaly detection application retrains the anomaly detection machine learning model per step 425. In a further embodiment, the asset anomaly detection application dynamically initiates model retraining according to step 425 based upon the structured false positive threshold value determination.

In an embodiment, the threshold value of anomaly assets is a user-determined percentage of assets among the plurality of anomaly assets. In an alternative embodiment, the threshold value of anomaly assets is a user-determined number (i.e., quantity) of assets among the plurality of anomaly assets. In an additional embodiment, the structured false positive threshold value is user-determined. According to such embodiments, the asset anomaly detection application optionally receives user input via at least one user application interface (e.g., user application interface 128) that is associated with the asset anomaly detection application. Optionally, the at least one user application interface is associated with an end user device communicably coupled to the asset anomaly detection application (e.g., EUD 103). The at least one user application interface includes a graphical user interface (GUI), a command line interface (CLI), and/or a sensory interface configured to discern and process user sound/voice commands and/or user gestures. In a related embodiment, a user associated with the at least one user application interface is at least one of a code developer, an asset administrator, and a computer network administrator. In a further embodiment, while the asset anomaly detection application retrains the anomaly detection machine learning model based upon respective structured false positive scores calculated for each of the plurality of anomaly assets, model retraining only may affect a subset of the plurality of anomaly assets during future model application, dependent upon any effect retraining has upon asset type prediction. A method of retraining the anomaly detection machine learning model in accordance with step 425 is described with respect to FIG. 8.

At optional step 430, responsive to user input, the asset anomaly detection application provides a model retraining summary via the at least one user application interface. The model retraining summary includes structured false positive data and a listing of anomaly assets among the plurality of anomaly assets having a structured false positive score calculated during the current structured false positive time window that exceeds the structured false positive threshold value. In an embodiment, the model retraining summary includes structured false positive data associated with other structured false positive time windows in addition to the current structured false positive time window. Step 430 is optional, since the asset anomaly detection application provides the model retraining summary responsive to any received user input. In an additional embodiment, the asset anomaly detection application receives the user input from the at least one user application interface.

In an embodiment, the asset anomaly detection application repeats one or more steps of the method 400 for a new structured false positive time window, e.g., in response to a user request via the at least one user application interface. A user optionally requests execution of one or more steps of the method 400 for only the current structured false positive time window or alternatively requests execution of one or more steps of the method 400 for multiple structured false positive time windows. In an alternative embodiment, the asset anomaly detection application optionally calculates total anomaly risk score per step 415 subsequent to model retraining per steps 420-425. In a further alternative embodiment, the asset anomaly detection application optionally calculates total anomaly risk score per step 415 subsequent to provision of a model retraining summary per step 430.

Figure 5:
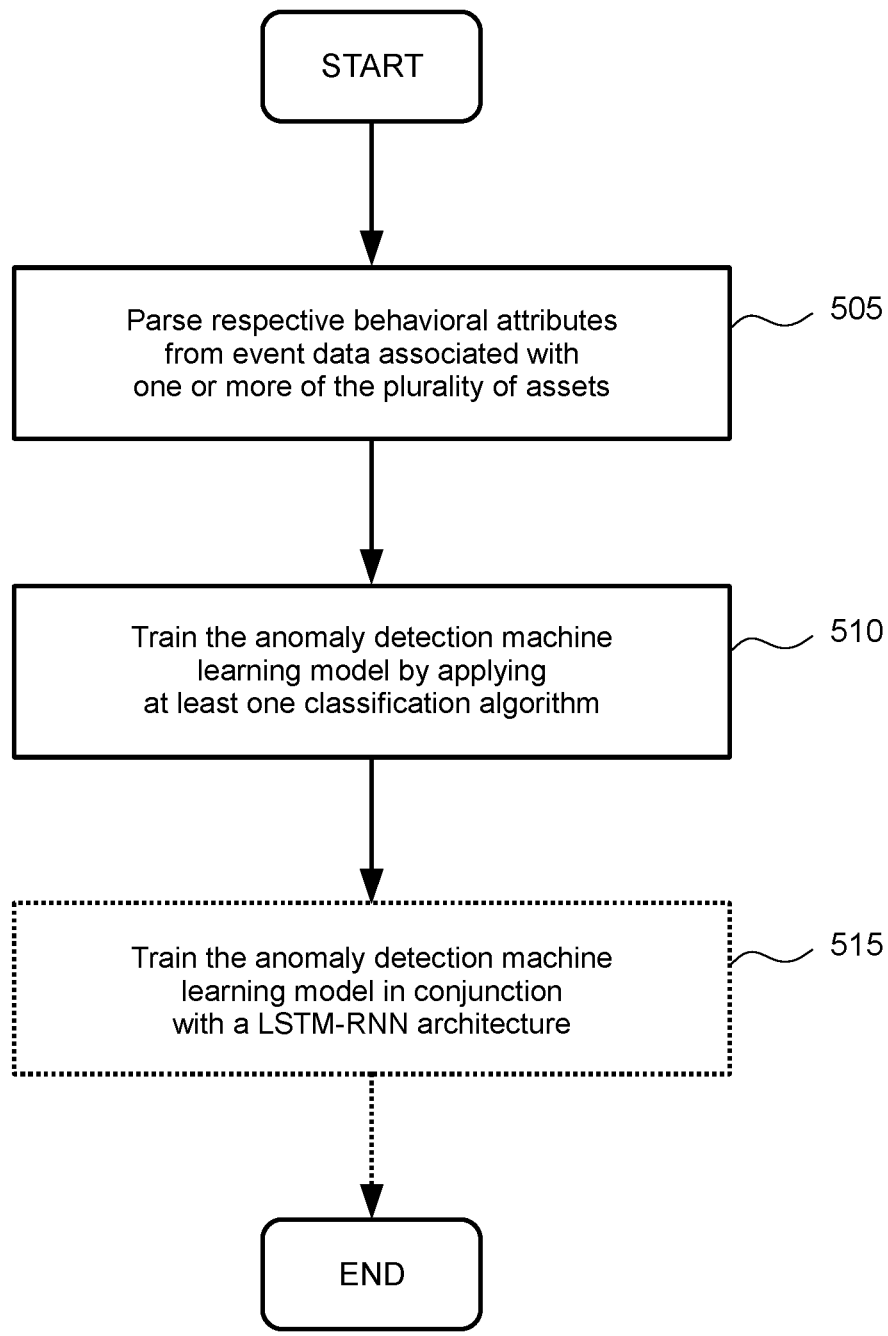
FIG. 5 illustrates a method of configuring an anomaly detection machine learning model, according to one or more embodiments.

FIG. 5 illustrates a method 500 of configuring the anomaly detection machine learning model. The method 500 begins at step 505, where the asset anomaly detection application parses respective behavioral attributes from event data associated with one or more of the plurality of assets. In an embodiment, the asset anomaly detection application receives such asset event data within multiple model time windows. A parsed respective behavioral attribute is related to asset behavior in the context of an asset event. In an additional embodiment, a behavioral attribute reflects at least one golden signal associated with asset monitoring. According to such additional embodiment, golden signals associated with asset monitoring optionally include one or more of asset latency, asset traffic, asset errors, and asset saturation. Asset latency may measure asset responsiveness, asset traffic may measure asset demand, asset errors may indicate asset failure events or asset warning events, and asset saturation may measure asset bandwidth under certain conditions. For instance, a behavioral attribute with respect to a production server asset may reflect server latency during a predefined time period. In a further embodiment, a behavioral attribute reflects authentication activity associated with asset events. For instance, an additional behavioral attribute with respect to a production server asset may reflect one or more authentication responses associated with a user attempting to access such asset.

At step 510, the asset anomaly detection application trains the anomaly detection machine learning model by applying at least one classification algorithm to derive associations between the respective behavioral attributes parsed from the event data per step 505 and each of a plurality of asset types. According to step 510, the asset anomaly detection application derives an association between a respective behavioral attribute parsed from the event data and a particular asset type among the plurality of asset types. By deriving such association, the asset anomaly detection application further derives an association between one or more assets related to the respective behavioral attribute and a particular asset type among the plurality of asset types, thus facilitating asset type prediction during model application as further described herein with respect to FIG. 6. In an embodiment, the asset anomaly detection application stores the derived associations between the respective behavioral attributes and each of the plurality of asset types in at least one knowledge base associated with the anomaly detection machine learning model. In an additional embodiment, the asset anomaly detection application stores metadata associated with the respective behavioral attributes in the at least one knowledge base, including metadata associated with asset events related to the behavioral attributes. In a further embodiment, the asset anomaly detection application stores metadata associated with each of the plurality of asset types in the at least one knowledge base, including metadata associated with asset events related to one or more of the plurality of asset types. In a further embodiment, the asset anomaly detection application applies one or more of the at least one classification algorithm based upon user preference. In a related embodiment, the asset anomaly detection application receives such user preference via the at least one user application interface.

In an embodiment, the asset anomaly detection application trains the anomaly detection machine learning model per step 510 by applying at least one supervised classification algorithm. In a related embodiment, the at least one supervised classification algorithm includes a random decision forest ensemble learning technique. According to an optional application of a random forest ensemble learning technique, the asset anomaly detection application associates a respective behavioral attribute with an asset type based upon an asset type selected for the respective behavioral attribute by the most decision trees among multiple decision trees constructed at training time. Additionally or alternatively, the at least one supervised classification algorithm includes a k-nearest neighbors (k-NN) classification algorithm. According to an optional application of a k-NN classification algorithm, the asset anomaly detection application associates a respective behavioral attribute with an asset type based upon the k closest training examples among the respective behavioral attributes associated with the anomaly detection machine learning model. Additionally or alternatively, the at least one supervised classification algorithm includes a support vector machine (SVM) algorithm. According to an optional application of a support vector machine (SVM) algorithm, the asset anomaly detection application associates respective behavioral attributes with one or more asset types based upon deriving a hyperplane in an n-dimensional space, where n is a number of features input into the anomaly detection machine learning model. Quantity and type of model features in this context depends upon model calibration and/or user input. In a further embodiment, the asset anomaly detection application trains the anomaly detection machine learning model per step 510 by applying at least one partially supervised classification algorithm in addition to or as an alternative to at least one supervised classification algorithm. In a related embodiment, the asset anomaly detection application derives an association between a respective behavioral attribute and an unlabeled asset type based upon at least one upon classification technique associated with at least one already labeled asset type. According to such related embodiment, the unlabeled asset type may be added to the at least one already labeled asset type for subsequent classification activity. In a further embodiment, based upon asset type labeling used upon application of at least one supervised classification algorithm and/or upon application of at least one partially supervised classification algorithm, the asset anomaly detection application classifies a respective behavioral attribute parsed from the event data per step 505 as being associated with one or more of the plurality of asset types based upon event characteristics, such as identity of an asset associated with an event, timing of the event, duration of behavioral activities associated with the event, relationships among assets associated with the event, etc.

At optional step 515, the asset anomaly detection application trains the anomaly detection machine learning model in conjunction with a long short-term memory recurrent neural network (LSTM-RNN) architecture. The LSTM-RNN architecture is configured to store time series pattern data with respect to one or more of the plurality of assets. The asset anomaly detection application optionally trains the anomaly detection machine learning model in conjunction with LSTM-RNN for purposes of time series forecasting with respect to the plurality of assets. Based upon LSTM-RNN, the asset anomaly detection application may store time series pattern data that exists with respect to each asset or asset type. Through time series forecasting, the asset anomaly detection application optionally identifies one or more cycle patterns over time with respect to the plurality of assets. LSTM-RNN stores state changes as a function of time for each asset among the plurality of assets. Based upon state changes related to respective assets over time, the asset anomaly detection application optionally utilizes LSTM-RNN data in conjunction with the at least one classification algorithm to predict asset anomalies. Through model training in conjunction with LSTM-RNN, the asset anomaly detection application is configured to determine anomalies from event data associated with one or more of the plurality of assets by deriving at least one time series pattern related to input data being stored with respect to an asset or an asset type.

Figure 6:
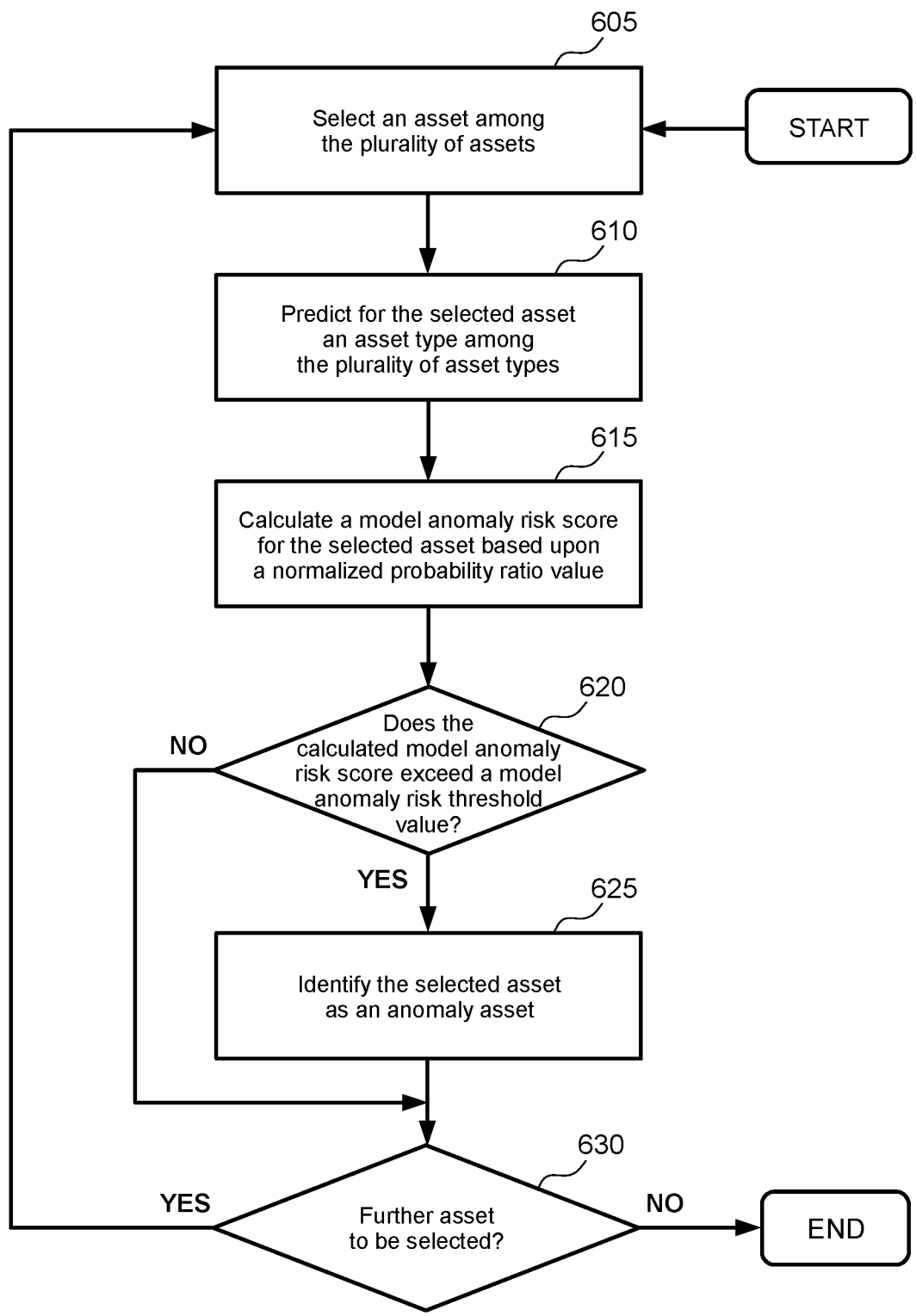
FIG. 6 illustrates a method of applying an anomaly detection machine learning model to each of a plurality of assets, according to one or more embodiments.

FIG. 6 illustrates a method 600 of applying the anomaly detection machine learning model to each of the plurality of assets. The method 600 provides one or more embodiments with respect to step 405 of the method 400. The method 600 begins at step 605, where the asset anomaly detection application selects an asset among the plurality of assets to which to apply the anomaly detection machine learning model. At step 610, the asset anomaly detection application predicts for the selected asset an asset type among the plurality of asset types based upon analyzing event data associated with the selected asset in view of model-derived associations between respective behavioral attributes and each of the plurality of asset types. In an embodiment, the asset anomaly detection application parses the event data associated with the selected asset to derive at least one behavioral attribute for the selected asset and compares the at least one behavioral attribute parsed for the selected asset to respective behavioral attributes associated with each of the plurality of asset types as derived from model configuration. Based upon the behavioral attribute comparison, the asset anomaly detection application predicts for the selected asset an asset type among the plurality of asset types.

At step 615, the asset anomaly detection application calculates, via the anomaly detection machine learning model, the model anomaly risk score for the selected asset based upon a normalized probability ratio value associated with a correct model prediction of the asset type for the selected asset. The asset anomaly detection application normalizes the probability ratio value to reflect an inverse correlation between asset type prediction probability and model anomaly risk score. According to the inverse correlation, relatively higher model anomaly risk score correlates to relatively lower asset type prediction probability, and conversely relatively lower model anomaly risk score correlates to relatively higher asset type prediction probability. In an embodiment, the normalized probability ratio value is a normalized ratio of a probability value associated with a correct model prediction of the asset type for the selected asset to a maximum probability value among a set of probability values associated with correct asset type model prediction. In a related embodiment, the asset anomaly detection application calculates the normalized probability ratio value by subtracting the aforementioned ratio from a value of one. In an additional embodiment, the normalized probability ratio value is a value between 0 and 1.

At step 620, the asset anomaly detection application determines whether the model anomaly risk score calculated for the selected asset exceeds a model anomaly risk threshold value. Responsive to determining that the model anomaly risk score calculated for the selected asset does not exceed the model anomaly risk threshold value, the asset anomaly detection application proceeds directly to step 630. Responsive to determining that the model anomaly risk score calculated for the selected asset exceeds the model anomaly risk threshold value, at step 625 the asset anomaly detection application identifies the selected asset as an anomaly asset. Due to the inverse correlation between asset type prediction probability and model anomaly risk score, the anomaly risk score exceeding the model anomaly risk threshold value indicates that the asset type prediction probability is relatively lower for the selected asset. Conversely, the anomaly risk score not exceeding the model anomaly risk threshold value indicates that the asset type prediction probability is relatively higher for the selected asset. In an embodiment, the model anomaly risk threshold value is user-determined, e.g., via the at least one user application interface. According to step 625, responsive to determining that a predicted asset type for the selected asset does not match an actual asset type for the selected asset to a sufficient level of probability as reflected by the calculated model anomaly risk score for the selected asset, the asset anomaly detection application identifies the selected asset as an anomaly asset. In an embodiment, additionally or alternatively to identifying the selected asset as an anomaly asset based upon the calculated model anomaly risk score for the selected asset exceeding the model anomaly risk threshold value, the asset anomaly detection application identifies the selected asset as an anomaly asset based upon the asset type prediction probability for the selected asset failing to exceed an asset type prediction probability threshold value.

At step 630, the asset anomaly detection application determines whether there is a further asset among the plurality of assets yet to be selected in the context of the method 600. Responsive to determining that there is a further asset to be selected, the asset anomaly detection application returns to step 605 to repeat model application steps with respect to the further asset. Responsive to determining that there is no further asset to be selected, the asset anomaly detection application proceeds directly to the end of the method 600. In an embodiment, consequent to processing the plurality of assets according to the method 600, the asset anomaly detection application generates the anomaly asset listing including each identified anomaly asset and sends the anomaly asset listing to the structured false positive detection agent.

Figure 7:
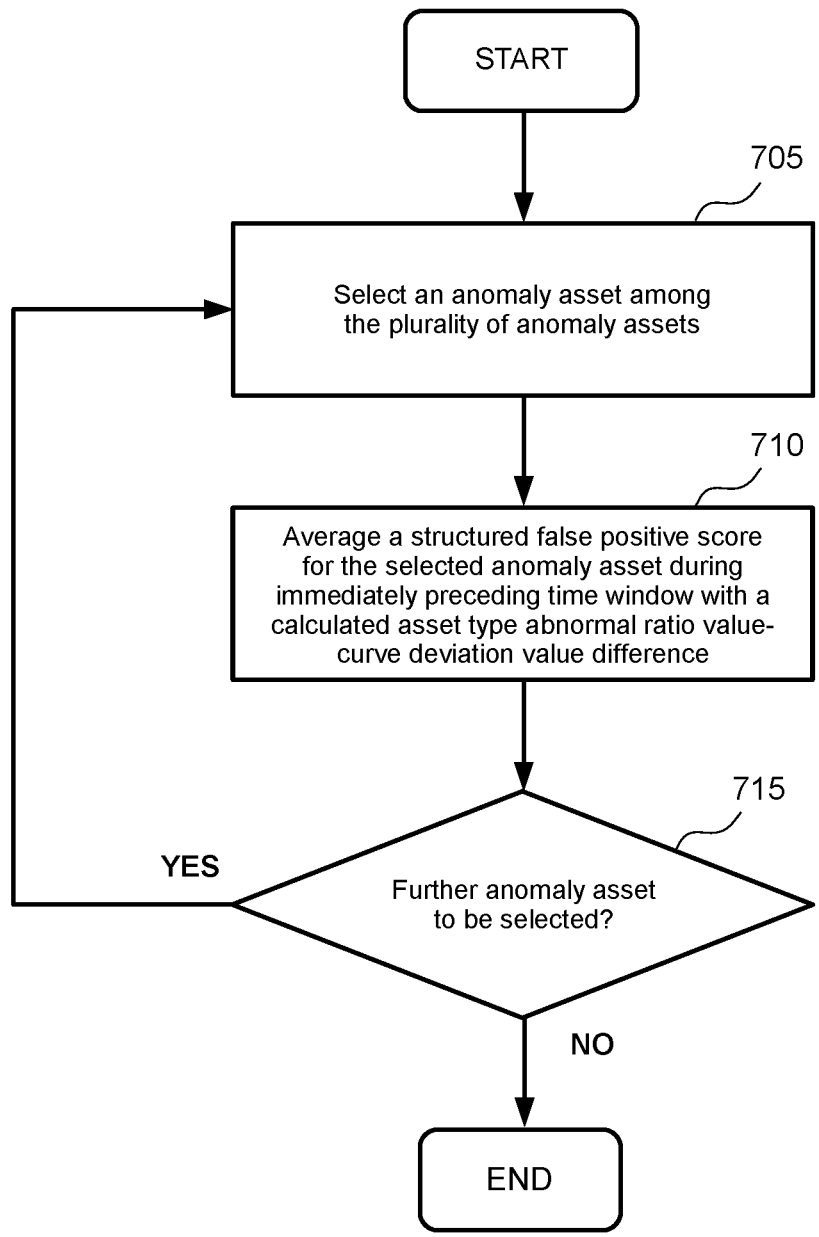
FIG. 7 illustrates a method of calculating a structured false positive score for each of a plurality of anomaly assets during a current structured false positive time window, according to one or more embodiments.

FIG. 7 illustrates a method 700 of calculating the structured false positive score for each of the plurality of anomaly assets during the current structured false positive time window. The method 700 provides one or more embodiments with respect to step 410 of the method 400. In an embodiment, one or more steps of the method 700 are executed via or otherwise facilitated by the structured false positive detection agent. The method 700 begins at step 705, where the asset anomaly detection application selects an anomaly asset among the plurality of anomaly assets for which to calculate the structured false positive score during the current structured false positive time window. At step 710, the asset anomaly detection application averages a structured false positive score for the selected anomaly asset during a time window immediately preceding the current structured false positive time window with a calculated difference between an asset type abnormal ratio value and a curve deviation value. Per step 710, the asset anomaly detection application calculates the structured false positive score for the selected anomaly asset during the current structured false positive time window based in part upon the structured false positive score calculated for the selected anomaly asset during the immediately preceding structured false positive time window. The asset anomaly detection application factors in the structured false positive score calculated for the selected anomaly asset during the time window immediately preceding the current structured false positive time window in the context of calculating the structured false positive score for the selected anomaly asset during the current structured false positive time window in order to track behavior associated with the selected anomaly asset over a time period extending beyond the current structured false positive time window. A relatively longer time period of consistent behavior designated as anomalous may indicate a relatively higher probability of a structured false positive associated with the selected anomaly asset.

In an embodiment, the asset type abnormal ratio value is a ratio of a number of anomaly assets among the plurality of anomaly assets associated with an asset type of the selected anomaly asset to a total number of assets of the asset type among the plurality of assets. According to such embodiment, the asset type abnormal ratio value is a value between 0 and 1. For example, given 5 total assets among the plurality of assets of a production server asset type, and given that 4 of the 5 production server assets are identified by the model as anomaly assets, then the asset anomaly detection application calculates an asset type abnormal ratio value of 4/5, or 0.8. In a related embodiment, the asset anomaly detection application determines the number of anomaly assets among the plurality of anomaly assets associated with the asset type of the selected anomaly asset based upon all anomaly assets associated with the asset type that are identified for a duration of model time windows equivalent to a duration of the current structured false positive time window, i.e., based upon all anomaly assets among the plurality of assets identified within all model time windows occurring within the current structured false positive time window.

In an embodiment, the asset anomaly detection application calculates the curve deviation value by applying a dynamic time warping (DTW) algorithm in order to measure behavioral similarity of the selected anomaly asset between the current structured false positive time window and the time window immediately preceding the current structured false positive time window. Only the current structured false positive time window and the time window immediately preceding the current structured false positive time window are relevant to calculating the curve deviation value per step 710. The asset anomaly detection application subtracts the curve deviation value from the asset type abnormal ratio value in the context of step 710 in order to remove nonlinear fluctuation within the time windows, in order to focus upon structured linear aspects affecting each time window. Relatively less curve fluctuation equates to a lower curve deviation value, which signifies that less curve deviation is removed from the structured false positive score. Accordingly, relatively less curve fluctuation indicates relatively higher probability of a structured false positive. Conversely, relatively greater curve fluctuation equates to a higher curve deviation value, which signifies that more curve deviation is removed from the structured false positive score. Accordingly, relatively greater curve fluctuation indicates relatively lower probability of a structured false positive.

In an embodiment, the curve deviation value is a normalized standard deviation value between 0 and 1. The asset anomaly detection application subtracts the normalized curve deviation value from the asset type abnormal ratio value, which per an aforementioned embodiment also is between 0 and 1. According to such embodiments, the calculated difference between the asset type abnormal ratio value and the curve deviation value, which is averaged with the structured false positive score for the selected anomaly asset during the time window immediately preceding the current structured false positive time window per step 710, is between 0 and 1.

At step 715, the asset anomaly detection application determines whether there is a further anomaly asset among the plurality of anomaly assets yet to be selected in the context of the method 700. Responsive to determining that there is a further anomaly asset to be selected, the asset anomaly detection application returns to step 705 to repeat structured false positive score calculation steps with respect to the further anomaly asset. Responsive to determining that there is no further anomaly asset to be selected, the asset anomaly detection application proceeds directly to the end of the method 700.

Figure 8:
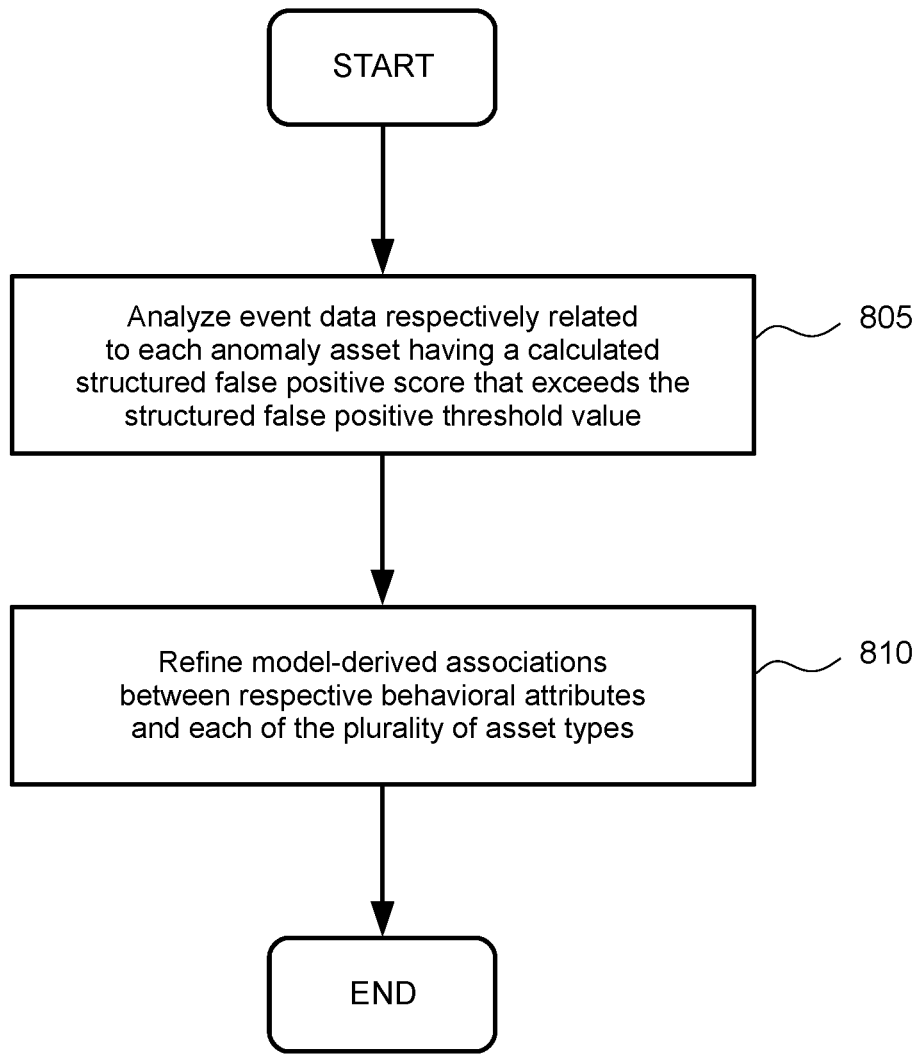
FIG. 8 illustrates a method of retraining an anomaly detection machine learning model, according to one or more embodiments.

FIG. 8 illustrates a method 800 of retraining the anomaly detection machine learning model. The method 800 provides one or more embodiments with respect to step 425 of the method 400. The method 800 begins at step 805, where the asset anomaly detection application analyzes event data respectively related to each anomaly asset among the plurality of anomaly assets having a structured false positive score calculated during the current structured false positive time window that exceeds the structured false positive threshold value. Per step 805, by analyzing event data specifically related to each anomaly asset among the plurality of anomaly assets for which the structured false positive score calculated during the current structured false positive time window exceeds the structured false positive threshold value, the asset anomaly detection application analyzes event data associated with any anomaly asset for which a structured false positive is indicated. In an embodiment, the asset anomaly detection application evaluates respective behavioral attributes parsed from the event data associated with each anomaly asset for which a structured false positive is indicated and determines whether associations between the respective behavioral attributes and one or more asset types were erroneously overlooked upon model application, thus resulting in the structured false positive.

At step 810, the asset anomaly detection application refines model-derived associations between respective behavioral attributes and each of the plurality of asset types by expanding a behavioral attribute range associated with one or more of the plurality of asset types. In an embodiment, the asset anomaly detection application refines the model-derived associations per step 810 based upon the analyzed event data associated with each anomaly asset for which a structured false positive is indicated. In an additional embodiment, the asset anomaly detection application stores refinements to the model-derived associations between the respective behavioral attributes and each of the plurality of asset types in the at least one knowledge base associated with the anomaly detection machine learning model. According to step 810, the asset anomaly detection application retrains the anomaly detection machine learning model by adapting associations between behavioral attributes and respective asset types among the plurality of asset types affected by at least one structured false positive in order to decrease probability of future anomaly misidentification associated with the at least one structured false positive.

Per step 810, the behavioral attribute refinement includes expanding a range of behavioral attributes associated with certain asset types among the plurality of asset types based upon analyzing behavioral attributes parsed from events associated with at least one structured false positive, such that the model-derived associations factor in structured false positives, thus increasing probability of a proper asset type prediction upon model application. In an embodiment, the asset anomaly detection application expands the range of behavioral attributes associated with an asset type by adding a new association between a behavioral attribute among the respective behavioral attributes and the asset type. According to such embodiment, responsive to determining a non-anomalous association between a behavioral attribute and an asset type consequent to analysis of asset event data associated with a structured false positive, the asset anomaly detection application adds a new association between the behavioral attribute and the asset type. For instance, responsive to determining a non-anomalous association between high usage behavior and a production server asset consequent to analysis of asset product release event data associated with a structured false positive prediction, the asset anomaly detection application adds a new association between high usage behavior and a production server asset type in view of the data associated with the product release. Based upon the newly added association between high usage behavior and the production server asset type, the asset anomaly detection application is less likely to inaccurately predict an asset type associated with a production server asset during a high usage event and consequently is less likely to indicate a structured false positive by misidentifying the production server asset as an anomaly asset. In a further embodiment, the asset anomaly detection application expands the range of behavioral attributes associated with an asset type by adding new respective associations between multiple behavioral attributes among the respective behavioral attributes and the asset type.

Consequent to refining the model-derived associations based upon analyzing asset event data associated with at least one structured false positive, respective behavioral attributes subsequently parsed from analogous asset event data may be more accurately addressed in the context of anomaly asset determination. According to the method 800, the asset anomaly detection application uses structured false positive data to retrain the anomaly detection machine learning model in order to increase asset type prediction accuracy and to decrease probability that an asset event associated with a structured false positive occurrence adversely affects proper asset type prediction during subsequent model application. Accordingly, through model retraining per the method 800, the asset anomaly detection application may avoid erroneous detection of anomalous asset event behavior and consequently may avoid misidentifying an asset among the plurality of assets as an anomaly asset due to a structured false positive.

The descriptions of the various embodiments have been presented for purposes of illustration but are not intended to be exhaustive or limited to the embodiments disclosed. All kinds of modifications made to the described embodiments and equivalent arrangements should fall within the protected scope of the various embodiments. Hence, the scope should be explained most widely according to the claims that follow in connection with the detailed description and should cover all possibly equivalent variations and equivalent arrangements. Many modifications and variations will be apparent to those of ordinary skill in the art without departing from the scope and spirit of the described embodiments. The terminology used herein is chosen to best explain the principles of the various embodiments, the practical application or technical improvement over technologies found in the marketplace, or to enable others of ordinary skill in the art to understand the various embodiments.

What is claimed is:

1. A computer-implemented method comprising:
    applying an anomaly detection machine learning model to each of a plurality of assets in a computing environment in order to determine a plurality of anomaly assets among the plurality of assets based upon a model anomaly risk score calculated for each of the plurality of assets consequent to asset event data analysis;
    calculating a structured false positive score for each of the plurality of anomaly assets during a current structured false positive time window;
    calculating a total anomaly risk score for each of the plurality of anomaly assets by deducting the structured false positive score calculated for each of the plurality of anomaly assets from the model anomaly risk score calculated for each of the plurality of anomaly assets; and
    retraining the anomaly detection machine learning model responsive to determining that a threshold value of anomaly assets among the plurality of anomaly assets have a structured false positive score exceeding a structured false positive threshold value.

2. The computer-implemented method of claim 1, further comprising:
    responsive to user input, providing a model retraining summary via at least one user application interface, wherein the model retraining summary includes structured false positive data and a listing of anomaly assets among the plurality of anomaly assets having a structured false positive score calculated during the current structured false positive time window that exceeds the structured false positive threshold value.

3. The computer-implemented method of claim 1, wherein configuring the anomaly detection machine learning model comprises:
    parsing respective behavioral attributes from event data associated with one or more of the plurality of assets; and
    training the anomaly detection machine learning model by applying at least one classification algorithm to derive associations between the respective behavioral attributes and each of a plurality of asset types.

4. The computer-implemented method of claim 3, wherein configuring the anomaly detection machine learning model further comprises:
    training the anomaly detection machine learning model in conjunction with a long short-term memory recurrent neural network (LSTM-RNN) architecture configured to store time series pattern data with respect to one or more of the plurality of assets.

5. The computer-implemented method of claim 1, wherein applying the anomaly detection machine learning model to each of the plurality of assets comprises:
    predicting for the asset an asset type among a plurality of asset types based upon analyzing event data associated with the asset in view of model-derived associations between respective behavioral attributes and each of the plurality of asset types;
    calculating, via the anomaly detection machine learning model, the model anomaly risk score for the asset based upon a normalized probability ratio value associated with a correct model prediction of the asset type for the asset; and
    identifying the asset as an anomaly asset responsive to determining that the model anomaly risk score calculated for the asset exceeds a model anomaly risk threshold value.

6. The computer-implemented method of claim 5, wherein the normalized probability ratio value is a normalized ratio of a probability value associated with a correct model prediction of the asset type for the asset to a maximum probability value among a set of probability values associated with correct asset type model prediction.

7. The computer-implemented method of claim 1, wherein calculating the structured false positive score for each of the plurality of anomaly assets during the current structured false positive time window comprises:
    averaging a structured false positive score for the anomaly asset during a time window immediately preceding the current structured false positive time window with a calculated difference between an asset type abnormal ratio value and a curve deviation value.

8. The computer-implemented method of claim 7, wherein the asset type abnormal ratio value is a ratio of a number of anomaly assets among the plurality of anomaly assets associated with an asset type of the anomaly asset to a total number of assets of the asset type among the plurality of assets.

9. The computer-implemented method of claim 1, wherein retraining the anomaly detection machine learning model comprises:
    analyzing event data respectively related to each anomaly asset among the plurality of anomaly assets having a structured false positive score calculated during the current structured false positive time window that exceeds the structured false positive threshold value; and
    refining model-derived associations between respective behavioral attributes and each of a plurality of asset types by expanding a behavioral attribute range associated with one or more of the plurality of asset types.

10. A computer program product comprising a computer readable storage medium having program instructions embodied therewith, the program instructions executable by a computing device to cause the computing device to:
    apply an anomaly detection machine learning model to each of a plurality of assets in a computing environment in order to determine a plurality of anomaly assets among the plurality of assets based upon a model anomaly risk score calculated for each of the plurality of assets consequent to asset event data analysis;
    calculate a structured false positive score for each of the plurality of anomaly assets during a current structured false positive time window;

calculate a total anomaly risk score for each of the plurality of anomaly assets by deducting the structured false positive score calculated for each of the plurality of anomaly assets from the model anomaly risk score calculated for each of the plurality of anomaly assets; and retrain the anomaly detection machine learning model responsive to determining that a threshold value of anomaly assets among the plurality of anomaly assets have a structured false positive score exceeding a structured false positive threshold value.

11. The computer program product of claim 10, wherein the program instructions further cause the computing device to:

responsive to user input, provide a model retraining summary via at least one user application interface, wherein the model retraining summary includes structured false positive data and a listing of anomaly assets among the plurality of anomaly assets having a structured false positive score calculated during the current structured false positive time window that exceeds the structured false positive threshold value.

12. The computer program product of claim 10, wherein configuring the anomaly detection machine learning model comprises:

parsing respective behavioral attributes from event data associated with one or more of the plurality of assets; and training the anomaly detection machine learning model by applying at least one classification algorithm to derive associations between the respective behavioral attributes and each of a plurality of asset types.

13. The computer program product of claim 10, wherein retraining the anomaly detection machine learning model comprises:

analyzing event data respectively related to each anomaly asset among the plurality of anomaly assets having a structured false positive score calculated during the current structured false positive time window that exceeds the structured false positive threshold value; and refining model-derived associations between respective behavioral attributes and each of a plurality of asset types by expanding a behavioral attribute range associated with one or more of the plurality of asset types.

14. A system comprising:
at least one processor; and
a memory storing an application program, which, when executed on the at least one processor, performs an operation comprising:
applying an anomaly detection machine learning model to each of a plurality of assets in a computing environment in order to determine a plurality of anomaly assets among the plurality of assets based upon a model anomaly risk score calculated for each of the plurality of assets consequent to asset event data analysis;

calculating a structured false positive score for each of the plurality of anomaly assets during a current structured false positive time window;

calculating a total anomaly risk score for each of the plurality of anomaly assets by deducting the structured false positive score calculated for each of the plurality of anomaly assets from the model anomaly risk score calculated for each of the plurality of anomaly assets; and retraining the anomaly detection machine learning model responsive to determining that a threshold value of anomaly assets among the plurality of anomaly assets have a structured false positive score exceeding a structured false positive threshold value.

15. The system of claim 14, wherein the operation further comprises:

responsive to user input, providing a model retraining summary via at least one user application interface, wherein the model retraining summary includes structured false positive data and a listing of anomaly assets among the plurality of anomaly assets having a structured false positive score calculated during the current structured false positive time window that exceeds the structured false positive threshold value.

16. The system of claim 14, wherein configuring the anomaly detection machine parsing respective behavioral attributes from event data associated with one or more of the plurality of assets; and training the anomaly detection machine learning model by applying at least one classification algorithm to derive associations between the respective behavioral attributes and each of a plurality of asset types.

17. The system of claim 14, wherein retraining the anomaly detection machine learning model comprises:

analyzing event data respectively related to each anomaly asset among the plurality of anomaly assets having a structured false positive score calculated during the current structured false positive time window that exceeds the structured false positive threshold value; and refining model-derived associations between respective behavioral attributes and each of a plurality of asset types by expanding a behavioral attribute range associated with one or more of the plurality of asset types.

* * * * *